(12) United States Patent
Ohira

(10) Patent No.: US 6,795,827 B1
(45) Date of Patent: Sep. 21, 2004

(54) INFORMATION TERMINAL AND BROADCASTING INFORMATION SERVICE SYSTEM

(75) Inventor: Eiji Ohira, Hamura (JP)

(73) Assignee: Hitachi, Ltd., Tokyo (JP)

( * ) Notice: Subject to any disclaimer, the term of this patent is extended or adjusted under 35 U.S.C. 154(b) by 232 days.

(21) Appl. No.: 09/629,890

(22) Filed: Jul. 31, 2000

(30) Foreign Application Priority Data

May 24, 2000 (JP) ........................................ 2000-153268

(51) Int. Cl.[7] ............................................. G06F 17/00
(52) U.S. Cl. ........................ 707/101; 707/10; 709/201
(58) Field of Search ....................... 707/1–10, 100–102, 707/200–201; 709/200–203, 217–219, 204–207; 725/91–92, 100, 115

(56) References Cited

U.S. PATENT DOCUMENTS 5,263,156 A * 11/1993 Bowen et al. .............. 707/202
5,530,939 A * 6/1996 Mansfield et al. .......... 707/201
5,857,181 A * 1/1999 Augenbraun et al. ......... 707/2

OTHER PUBLICATIONS

Patel et al. (Ticket based service access for the mobile user, 1997, ACM, pp. 223–233).*
Bowen et al. (The Datacycle architecture, 1992, ACM, pp. 71–81).*
Bowen et al. (The Datacycle architecture and research prototype, 1992, IEEE, pp. 102–108).*
Bredin (Market–based resource control for mobile agents, 1998, ACM, pp. 197–204).*

* cited by examiner

Primary Examiner—Jean M. Corrielus
Assistant Examiner—Joon Hwan Hwang
(74) Attorney, Agent, or Firm—Antonelli, Terry, Stout & Kraus, LLP

(57) ABSTRACT

The invention provides a broadcasting information service system capable of timely and flexible generation, management, broadcasting and use of information which fits needs of every user and has little redundancy. An information terminal 600 comprises: one or more of common data files 410 in which the data is presented in tabular form; a receiver unit 610 which receives a data manipulation command file 420 describing the data manipulation for the common data files; and a memory unit for environment variable 670 which stores therein the names and the values of one or more of variables in pairs. The data manipulation of the received data file is performed in accordance with the contents of the memory unit for environment variable 670 and the specification of the data manipulation command file 420, and stores therein the results of the manipulation.

4 Claims, 17 Drawing Sheets

| Selection Key | ID Number | File Name | Data |
|---|---|---|---|
| | | | |

FIG. 5

Customer.xmld

| CustomerID | CustomerName | BaseID | Point(s) | Address | TelephoneNumber |
|---|---|---|---|---|---|
| 1 | AAA | 15 | 80 | | |
| 2 | BBB | 15 | 120 | | |
| 3 | CCC | 15 | 120 | | |
| 4 | DDD | 15 | 110 | | |
| 5 | EEE | 14 | 70 | | |
| | | | | | |

Order.xmld

| OrderNumber | CustomerID | MenuID | DateOfOrder | Done |
|---|---|---|---|---|
| 1 | 1 | 14 | 99/06/05 | Unfinished |
| 2 | 2 | 8 | 99/06/07 | Unfinished |
| 3 | 3 | 3 | 99/06/05 | Finished |
| 4 | 4 | 14 | 99/06/05 | Unfinished |
| 5 | 5 | 3 | 99/06/05 | Unfinished |
| | | | | |

Menu.xmld

| MenuID | Schedule | MenuName | Price |
|---|---|---|---|
| 14 | 99/06/05 | Chinese-style *** | 500 |
| 8 | 99/06/07 | Country-style *** | |
| 3 | 99/06/05 | Japanese-style cooked *** | |
| 4 | 99/06/05 | Spaghetti with *** | |
| | | | |

FIG. 6

| OrderNumber | MenuName | DateOfOrder | Price |
|---|---|---|---|
| 1 | Chinese-style *** | 99/06/05 | 500 |

FIG. 7

| CustomerID | BaseID | Done |
|---|---|---|
| 1 | 15 | Unfinished |
| 2 | 15 | Finished |
| 3 | 15 | Unfinished |
| 4 | 15 | Unfinished |

FIG. 8

DELIVERY SERVICE OF MEAL HP

- Today's your order
- Truck of your meal

FIG. 9

DELIVERY SERVICE OF MEAL HP

- Today's your order
- Truck of your meal

| Order No. | Menu Name | Date of Order | Price |
|---|---|---|---|
| 1 | Chinese-style *** | 99/06/05 | 500 |

| CustomerID | Schedule | MenuName | Price |
|---|---|---|---|
| AAA | 99/06/05 | Chinese-style *** | 500 |
| BBB | 99/06/05 | Japanese-style cooked *** | |
| CCC | 99/06/05 | Chinese-style *** | |
| DDD | 99/06/05 | Japanese-style cooked *** | |

FIG. 12

```xml
<?xml version="1.0" encoding="Shift_JIS"?>
<DATA>
<WHERE>
  <append File="order.xmld"> 1 </append>
  <BaseID op= "eq" const="you.BaseID"> </BaseID>
</WHERE>

<ORDERs>
<order>
  <OrderNumber>1</OrderNumber>
  <CustomerID>1</CustomerID>
  <CustomerName>AAA</CustomerName>
  <BaseID>15</BaseID>
  <MenuID>14</MenuID>
  <DateOfOrder>99/06/07</DateOfOrder>
  <Done>False</Done>
</order>
<order>
  < OrderNumber >2</ OrderNumber >
  < CustomerID >2</ CustomerID >
  < CustomerName >BBB</ CustomerName >
  < BaseID >15</ BaseID >
  <MenuID>8</MenuID>
  < DateOfOrder >99/06/07</DateOfOrder >
  <Done>False</Done>
</order>
        :
</ORDERs>
</DATA>
```

```
<?xml version="1.0" encoding="Shift_JIS"?>
<SETenv >
 <SELECT>
  <ATR name="BaseID "> BaseID </ATR>
 </SELECT>
 <FROM>
  <REF RS1= "Order.xmld"/>
 </FROM>
 <WHERE>
  <CustomerID  op= "eq" const="you"> </CustomerID>
 </ WHERE >
</SETenv >
```

| PRODUCTID | PRICE | FROM | TO |
|---|---|---|---|
| 1 | 900 | 100 | 300 |
| 2 | 720 | 100 | 300 |
| 3 | 450 | 100 | 300 |
| 1 | 1000 | 0 | 100 |
| 2 | 800 | 0 | 100 |
| 3 | 500 | 0 | 100 |

ORDER HP

● After confirming your order, enter your password and click an "OK" button

● Password  [ **** ]   [ OK ]

| Order No. | Menu Name | Date of Order | Price |
|---|---|---|---|
| 14 | Chinese-style *** | 99/06/07 | 500 |

320 BROAD CAST INFORMATION GENERATING PROGRAM

FIG. 25

```xml
<?xml version="1.0" encoding="Shift_JIS"?>
<UPDATE File="Order.xmld">
 <OPR version="1">
  <SET>
   <OrderNumber>1</ OrderNumber >
   <CustomerID>1</CustomerID>
   < CustomerName>AAA</CustomerName>
   <BaseID>15</BaseID>
   <MenuID>14</MenuID>
   <DateOfOrder>99/06/07</DateOfOrder>
   <Done>True</Done>
  </SET>
  <WHERE>
   <OrderNumber operator="=" constant="1"></OrderNumber>
  </WHERE>
 </OPR>
 <OPR version="2">
  <SET>
   <OrderNumber>3</OrderNumber>
   <CustomerID>3</CustomerID>
   <CustomerName>FFF</CustomerName>
   <BaseID>15</BaseID>
   < MenuID>8</ MenuID>
   <DateOfOrder>99/06/07</DateOfOrder>
   <Done> True </Done>
  </SET>
  <WHERE>
   <OrderNumber operator="=" constant= "2"></OrderNumber>
  </WHERE>
 </OPR>
</UPDATE>
```

FIG. 26

```
<?xml version="1.0" encoding="Shift_JIS"?>
<INSERT-T File="Order.xmld" >
 <OPR version="1">
   <OrderNumber> 31 </OrderNumber>
   <CustomerID> 1 </CustomerID>
   <CustomerName> AAA </CustomerName>
   <BaseID> 15 </BaseID>
   <MenuID> 14 </MenuID>
   <DateOfOrder> 99/06/19 </DateOfOrder>
   <Done> False </Done>
 </OPR>
</INSERT-T>
```

FIG. 27

```
<?xml version="1.0" encoding="Shift_JIS"?>
<DELETE-T File="Order.xmld" >
 <OPR version="2">
  <WHERE>
    <OrderNumber operator="eq" constant="1"></OrderNumber>
  </WHERE>
 </OPR>
</DELETE-T>
```

INFORMATION TERMINAL AND BROADCASTING INFORMATION SERVICE SYSTEM

FIELD OF THE INVENTION

The present invention relates to a broadcasting information service system, and more specifically relates to an information service system which can achieve the broadcasting information service to individual information terminals and to an information terminal through which a user can select and obtain desired information from common information broadcasted from the information service system.

RELATED BACKGROUND ART

The information service using a portable or mobile information terminal (e.g., a portable telephone) includes two types; one using two-way communication, and one using broadcast communication. Generally, in a two-way communication type of information service, a user can perform a search freely, and therefore can search for desired information. However, it has such a disadvantage that the communication cost becomes expensive because the communication line is occupied for the search.

In a broadcast type of information service, on the other hand, since information is broadcasted, the information can be provided to a user without highly burdening the mobile telecommunication network and the host, and therefore the information is expected to be provided at a low cost.

When using a mobile information terminal, a user often accesses to an information service while moving. In this case, a broadcasting type of information service which requires fewer operations for input and so on would be desirable. This is because a free search function in a broadcasting type, which is an advantage of a two-way communication type, requires complicated input operations for a search and so on, which may be disadvantageous in a mobile information terminal. However, a broadcasting type information service has such drawbacks that the provision of information is undifferentiated as compared with a two-way communication type one and it is difficult to provide information which meets the requirements of individual users.

To improve the drawbacks, it may be preferred to prepare information for each user and supply it to the user. However, this method causes the increase in amount to be processed on the part of the information supplier and the increase in load on the communication network. For the purpose of reducing the redundancy caused by data common among users, data which is needed by every user may be broadcasted as a common data file to every user. A data manipulation file for selecting desired information from the common data file may be prepared for and broadcasted to every user. However, such a type of broadcasting information service has the following disadvantages.

(1) Although the data necessary for a user is only a portion of the common data file, it is needed to store the whole of the common data file, which may be a burden particularly on a mobile equipment with a small memory capacity.

(2) Provision of a data manipulation command file customized for every user may result in complicated management of the file. In order to lessening this problem, if the data manipulation command file is designed to execute a complicated processing, then the amount to be processed by the mobile information terminal may be increased.

(3) The size of a data file which is presented in tabular form tends to become large, and therefore the load on the mobile telecommunication network is increased.

(4) Even when non-uniform radio environments are assumed, little consideration is given to a temporary breakdown of communications.

SUMMARY OF THE INVENTION

The object of the present invention is to provide a broadcasting information service system which can overcome the above-mentioned drawbacks and which is capable of timely and flexible generation, management, broadcasting and utilization of information which has little redundancy and fits the needs of every user.

Among users who have access to the same service regardless of whether or not they obtain service, information needed is mostly common to the users. Further, the whole of the information is not always updated. According to the present invention, the information service system comprises: an information broadcasting system for broadcasting to users one or more data files in which data is presented in tabular form and a data manipulation command file which specifies the data manipulation of the data file; and a mobile or portable information terminal (hereinafter, simply referred to as an "information terminal") which executes the data manipulation of the received data file in accordance with the specification of the data manipulation command file.

The information terminal according to the present invention comprises: a memory unit for attribute/value which stores names and values of one or more variables in pairs; and a unit which, upon the processing of the received data manipulation command file, when a constraint value of an attribute used for processing of data presented in tabular form is designated as a previously defined specific character string or an attribute name appended with a predetermined specific character string, employs the value of the stored variable as the constraint value of the corresponding attribute. Upon receiving the data manipulation command file, the information terminal processes a data file which has already broadcasted in accordance with the command described in the data file description file. For example, a modification, insertion or deletion may be made to a portion of the data file to update the data file, or it may be possible to compute the join, the selection and the projection of a set of data files which have already broadcasted to generate a new data file. In the data manipulation command file, there may be described a command for modification, insertion or deletion of the contents of the memory unit which stores therein the name and the value of the variable in a pair. Upon receiving the command through the data manipulation command file, the information terminal executes the modification of the value of the variable stored in the memory unit or the insertion or deletion of the variable itself in accordance with the command. When the received file contains information on the constraint for selecting a portion of the data as the information for data manipulation in addition to data presented in tabular form, there are provided a unit for selecting the portion of the data in accordance with the constraint and a unit for storing the selected portion of the data. In this case, the receiver can store only the necessary information by a simple processing procedure. In addition, since information on the variables are provided through the data file common to all users and the data manipulation command file, necessity of individual information processing for every user can be eliminated and management can be performed readily.

The information service system comprises: a unit for storing an ID number of a data file to be newly broadcasted and information of a data file which has been broadcasted last time; a unit for detecting the number of updated tuples by comparing the contents between the data file to be newly broadcasted and the data file which has been broadcasted last time; a unit for updating the ID number and assigning the updated ID number as an ID number of the file to be newly broadcasted, if any change is needed; and a unit for controlling the broadcasting of either the whole of the contents of the new data file or only the changed portion thereof depending on the number of updated tuples. A unit may be provided which achieves the broadcasting of only the changed portion of the new file by supplying a data manipulation command file containing a command for making a modification, insertion or deletion to the data file which has been broadcasted last time. In this case, load on the communication network can be reduced and the processing procedure on the receiver's part can be simplified, since the processing can be performed through the data manipulation command file. When the broadcasting of only the changed portion of a file is performed consecutively, there may be provided a unit for counting the number of broadcasting operations and a unit for applying information on the number to the command for making a modification, insertion or deletion, and adding the command to the data manipulation command file which has been broadcasted last time to prepare a new data manipulation command file. There may provided a unit for splitting the data file in the minimum units of tuple and a unit for broadcasting each of the splitted data files to the information terminal together with a command which instructs to join the splitted data files and information on the file name of the original data file, the total number of the split files and the split number of the split file. In this case, stable communication becomes possible even under environments where there is a risk of temporal breakdown of communications.

Accordingly, the information terminal according to the present invention comprises: a memory unit for attributes. An attribute consists of an attribute name and an attribute value in a pair, a receiver unit which receives a broadcasted file, and an information processing unit which processes the received file; when an attribute constraint value used for processing of data presented in tabular form is designated as a predetermined specific character string or an attribute name appended with a predetermined specific character string, the information processing unit employing a value of a variable stored in the memory unit for attribute under the same name as the attribute, as the attribute constraint value. As used herein, the "processing of the received file" includes the processing of the data in the received file and the data processing instructed by the received file.

When the received file contains data presented in tabular form and information for manipulating the data, the information processing unit may execute data-manipulation of the received file in accordance with the information and stores the file therein after the data-manipulation. When the information is one concerning the constraint for selecting a portion of the data, the information processing unit may select the portion of the data in accordance with the constraint and stores only the selected data as the content of the received file.

When a command for modification of the contents comprising the name and the value in a pair of the variable stored in the memory unit or insert or delete the variable stored in the memory unit is described in the received file, the information processing unit may execute the modification of the value of the variable stored in the memory unit or the insertion or deletion of the variable itself in accordance with the command.

When a manipulation for generating a new file by updating or data-manipulation of data which has been received is described in the received file, the information processing unit may execute the updating or manipulation.

The broadcasting information service system according to the present invention is one for broadcasting data to a plurality of information terminals in the form appended with a file name and an ID number representing a file version; the system comprising: a unit for storing an ID number of a data file to be newly broadcasted and information of a data file which has been broadcasted last time; a unit for detecting the number of updated tuples by comparing the contents between the data file to be newly broadcasted and the data file which has been broadcasted last time; a unit for updating the ID number and assigning the updated ID number as an ID number of the file to be newly broadcasted, if any change is needed; and a unit for controlling the broadcasting of either the whole of the contents of the new data file or only the changed portion thereof depending on the number of updated tuples.

The broadcasting of only the updated portion of the new file may be achieved by supplying a data manipulation command file in which one or more commands for making modification, insertion or deletion in the data file which has been broadcasted last time are described. When the broadcasting of only the updated portion of a file is performed consecutively, the number of broadcasting operations may be counted, information on the number may be applied to the command for the modification, insertion or deletion, and a new data manipulation command file may be prepared in addition to the data manipulation command file which has been broadcasted last time.

When the size of the data file is larger than a predetermined value, the data file may splitted in the minimum units of tuple, each of the splitted data files may be broadcasted to an information terminal together with a command which instructs to join the splitted data files and information on the file name of the original data file and the split number of the split file. In this case, since there may be a situation where the file cannot be broadcasted due to breakdown of communications, it is preferably to add information on the total number of the split files. The addition of the information on the total number of the split files may be achieved by adding information by which the file is indicated to be the last file to the last split file.

The information service system according to the present invention comprises a point-related information supply unit which broadcasts information based on points to a plurality of information terminals each carrying points of a user; the point-related information supply unit broadcasting one or more common files containing data in which the information based on points is described and conditions for selecting and storing only data based on the points of a user of each information terminal from the data in which the information based on points is described.

The information service system according to the present invention comprises: a unit for management of information on contract and deal of each customer and management of identification information and points of each customer in a pair; a point supply unit which broadcasts, to an information terminal of each customer, a common file in which points of each customer are described and a data manipulation command file in which a manipulation for selecting only the points of a customer of each information terminal from the common file and storing the selected points in a memory unit for attributes of the information terminal; and a point-related information supply unit which broadcasts one or more common files containing data in which information based on points is described and conditions based on which each information terminal selects only data based on the points of the user of the information terminal from the data in which information based on points is described and stores the selected data in the information terminal.

The term "point" of each customer includes, for example, a point given based on the contract fee or the term of contract, a point given based on the purchase price, an extra point given during only a special sales campaign and a point given to a limited subject (e.g., male, female). The information based on the points includes, for example, a discount price of a good, information on limited bargain goods and information on free-of-charge services (e.g., use of a resting room in an airport) based on the points.

The information terminal according to the present invention comprises a memory unit for attribute which stores a value of points, a receiver unit which receives a file comprising a condition described using a predetermined specific character string and data in which information based on points is described, and an information processing unit which processes the received file; the information processing unit selectively storing the information based on points in accordance with a condition which is obtained by replacing the specific character string with the value of points stored in the memory unit for attribute/value.

The information terminal according to the present invention comprises: an extended IC card, which independently stores a value of points; a memory unit for attributes, which stores a value of points; a receiver unit, which receives a common file in which points of every user are described and a data manipulation command file in which a manipulation for selecting only the points of a user of the information terminal from the common file and storing the points in the memory unit for attribute/value is described; and an information processing unit, which processes the files received by the extended IC card and the receiver unit to set the total points on the memory unit for attributes; the information processing unit selecting only the points of the user of the information terminal from the common file in which the points of the user is described in accordance with the description in the data manipulation command file and storing the sum of the selected points and the points stored in the extended IC card in the memory unit for attributes.

This specification includes part or all of the contents as disclosed in the specification and/or drawings of Japanese Patent Application No. 2000-153268, which is a priority document of the present application.

The above and other objects, effects, features and advantages of the present invention will become more apparent from the following description of embodiments thereof taken in conjunction with the accompanying drawings.

BRIEF DESCRIPTION OF THE DRAWINGS

FIG. 5 shows examples of a database which is managed by an information server of a service company.

FIG. 6 shows an example of a table showing the contents of a meal order.

FIG. 7 shows an example of a table showing the current state of truck of ordered meals by a delivery person in an area to which a customer belongs.

FIG. 8 shows an example of a display panel.

FIG. 9 shows another example of a display panel.

FIG. 12 is an illustration of an example of a common data file according to the present invention.

FIG. 25 shows an example of a data manipulation command file used for modification of an attribute value in a tuple.

FIG. 26 shows an example of a data manipulation command file used for insertion of a tuple.

FIG. 27 shows an example of a data manipulation command file used for deletion of a tuple.

DETAILED DESCRIPTION OF THE INVENTION

Hereinbelow, preferred embodiments of the present invention will be illustrated in detail with reference to the drawings attached.

Figures 1, 2:
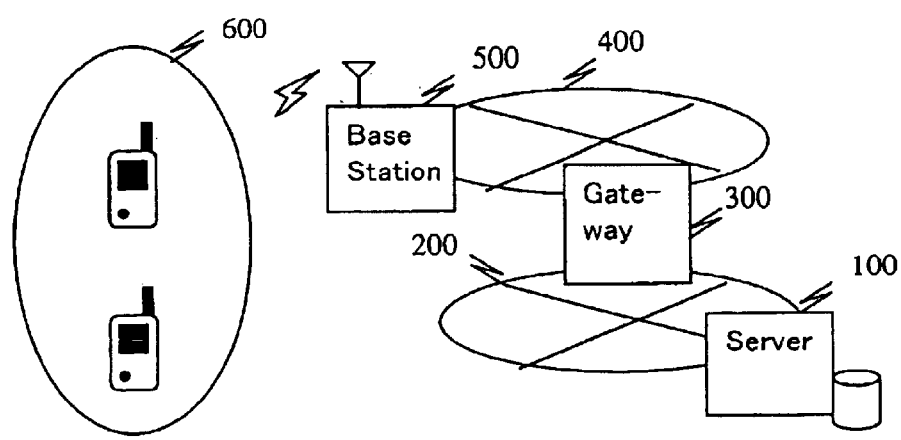
FIG. 1 is a schematic illustration of an embodiment of an information service system according to the present invention.
FIG. 2 is an illustration showing the data structure of information to be broadcasted to an information terminal.

FIG. 1 shows an example of the entire constitution of an information service system according to the present invention. A gateway 200 gathers data of a text file, an HTML file, an image file (e.g., GIF, JPEG), a database and so on from a server 100 via an internet 200 and captures the data therein at regular intervals. The identity of the server and the storage area therein, from which the information should be read, is previously recorded in the gateway 300. A directory file which specifies a file to be read in a specified storage area in the server 100 is stored in the server 100. The gateway 300 reads therein the directory file and then reads the data file in accordance with the instructions of the directory file.

All of the files read are appended with header information shown in FIG. 2, and then sent to a plurality of information terminals 600 via a mobile telecommunication network 400 and a base station 500. As shown in FIG. 2, the header portion includes a selection key, an ID number and a file name, and the data portion stores the contents of the file read from the server 100. The information terminal 600 reads the selection key in the header of the received data, and stores only information directed to the information terminal 600 or a group to which the information terminal 600 belongs and skips other information. The ID number represents the version of the file. Since a proper sending/receiving is not always ensured under uniform radio environments due to deterioration of communication state or the like, a file is send to several times. In the information terminal 600, the ID number of the file which has been stored is compared with the ID number of the broadcasted file to eliminate any unnecessary storage processing.

When a mobile multicast telecommunication mode is employed in the mobile telecommunication network 400, the broadcasting of information can be performed at a low cost. A telecommunication network normally employs an one-to-one communication mode. Therefore, if a piece of information is to be broadcasted to 100 users, it is necessary to provide 100 communication lines from the gateway 300. When the same information is to be supplied to users, the information may be send to the immediately upstream from each user over one line and then the line may be branched toward each user. Thus, only one communication line is needed to be reserved for the halfway of the supply. The communication scheme which achieves the communication in this manner is called a "multicast telecommunication". A multicast communication enables to supply information at low communications costs since the number of lines occupied is small.

In a broadcasting communication such as a multicast telecommunication, individual supply of information to information terminals 600 can be achieved to some extent by using a selection key in the header. However, for more elaborate information service to each information terminal 600, management of the information in the server may become very complicated.

Figure 3:
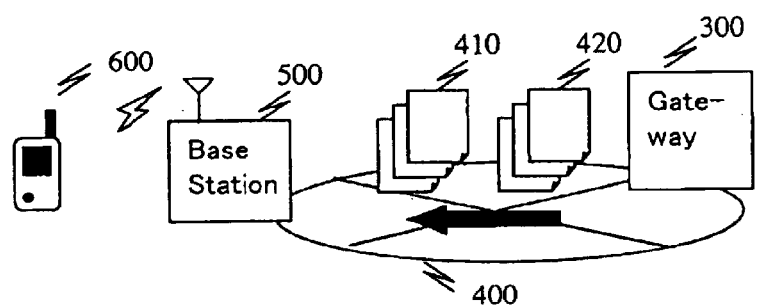
FIG. 3 is an illustration of assistance in explaining the broadcasting of information to an information terminal.

In order to overcome such a drawback, one or a plurality of common data files 410 which are common among users and a data manipulation command file 420 which specify the manipulation of the data are supplied, as shown in FIG. 3. The common data file 410 consists of one or more of data files each presented in tabular form. The data manipulation command file 420 is described, for example, through SQL language for database. On the part of the information terminal 600, the results of the manipulation of the common data file 410 according to the instruction of the received data manipulation command file 420 are stored, whereby information which fits the user's needs can be provided flexibly. In addition, on the part of the server 100, it is possible to manage information using a conventional database. The common data file 410 may be converted into a text format through an extended markup language XML or the like and then broadcasted by prior art techniques.

Figure 4:
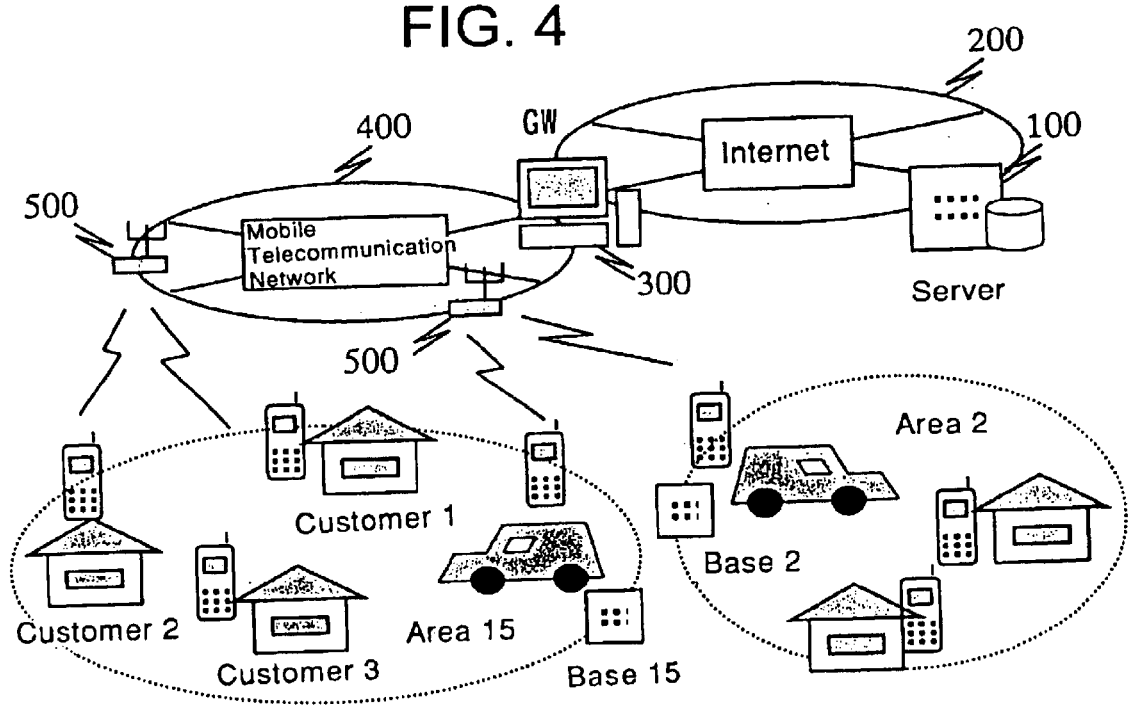
FIG. 4 is a schematic illustration of an example of the application of an information service system according to the present invention to an at-home care service or a meal delivery service.

FIG. 4 shows an example of the application of the information service system according to the present invention to an at-home care service or a meal delivery service. A delivery service company (i.e., supplier) takes meal delivery orders from customers, for example, on a weekly or monthly bases and sends the orders to a cooking center, where all of the meals ordered by customers in a given day are prepared. The customers are divided into several groups by geographic area (in FIG. 4, only two areas, Area 2 and Area 15, are exemplarity shown). The cooked meals are transported to a delivery base for each area by a delivery car. In each area, a delivery person receives the meals from the delivery base and then delivers it to each customer's home.

FIG. 5 shows an example of a database which is managed by a server 100 of a delivery service company. Three tables presented in tabular form shown in FIG. 5 which manage three items (i.e., "Customer", "Order", "Menu"), respectively, are broadcasted to the information terminals 600 of all customers and all delivery persons as a common data file 410. The terms, "CustomerID", "CustomerName", "BaseID", "Pont(s)" and so on in the "Customer" table are called "attributes". Each line in the tables is called a "tuple". The first tuple in the upper table represents the follows: CustomerID="1", CustomerName="AAA", BaseID="15" and Points="80".

For example, when two data manipulation command files 420 shown below are broadcasted from the server 100 to Customer 1 together with the above three common data files, a table showing the contents of today's meal order (FIG. 6) can be obtained using the data manipulation command file 1, and a table showing the current state of track of meal delivery by a delivery person in the area where Customer 1 belongs (FIG. 7) can be obtained using the data manipulation command file 2. In FIG. 7, the term "Done" refers to the state of track or delivery, in which "Finished" means that the delivery is finished and "Unfinished" means that the deliver is unfinished. From the upper table in FIG. 7, it is found that delivery to only a customer (i.e., "CustomerID="2") is currently finished.

(1) Data manipulation command file 1:

π OrderNumber, MenuName, Dateoforder, Price (σ CustomerID=1 join(Order, Menu))

(2) Data manipulation command file 2

π CustomerID, BaseID, Done (σ BaseID=15 join(Customer, Order))

In the above files, the term "join(A, B)" means a manipulation to couple Table A and Table B into one table; the conditional expression σ means a manipulation to select only tuples (lines) which satisfy the conditional expression among the tuples in the coupled table; the attribute σ refers to computation of the projection for preparing a table containing only the specified attributes in the table. Unspecified attributes are discarded. Here, the constraint on date is omitted.

The information terminal 600 stores the two tables therein under the names of "Today's_meal_delivery" and "State_of_Delivery", respectively. As mentioned in detail below, names to be stored in the information terminal 600 are also specified by the data manipulation command file 420. An HTML file through which the display unit of the information terminal 600 can display as shown in FIG. 8 is also broadcasted from the server 100 to the information terminal 600. In the HTML file, there are a description to specify a table of "Today's_Order_Menu" as a table to be linked with the passage "Today's Your Order" and a description to specify a table "State_of_Delivery" as a table to be linked with the passage "Truck of Your Meal". When a user clicks the passage "Today's Your Order", a table "Today's_Order_Menu" can be displayed as shown in FIG. 9. Such display functions can be achieved by existing Web browsers.

Figures 10, 11:
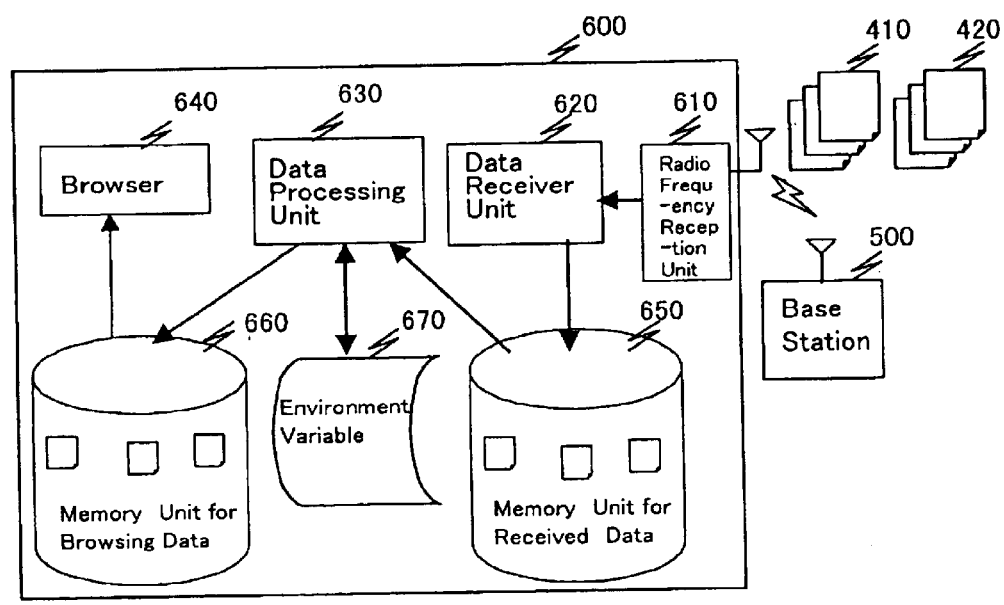
FIG. 10 is an explanatory illustration of the state of the meal order.
FIG. 11 is a block diagram showing the processing performed by an embodiment of an information terminal according to the present invention.

A delivery person can obtain the orders from customers of his parish (in this example, Area 15) as shown in FIG. 10 from the common data file shown in FIG. 5 using the following data manipulation command file 3.

(3) Data manipulation command file 3

π CustomerName, Schedule, MealName, Price (σ BaseID=15 join(Customer, Order, Menu))

As mentioned above, it becomes possible to retrieve proper information from the common data file according to the purposes and the needs of a user and provide the information to the user without the need of any manipulation of a database. Reports on the meal order from customers and the state of delivery or truck of ordered meals by a delivery person can be available using a two-way communication with a mobile telephone at low costs, since the amount of information is small and the operation is simple.

In the system as described above, however, the following problems may be assumed.

(1) Although the data necessary for a user is only a portion of the common data file 410, it is needed to store the whole of the common data file, which may be a burden particularly on a mobile equipment with a small memory capacity.

(2) Provision of a data manipulation command file 410 customized for every user may result in complicated management of the file. For example, in the example described above, the data manipulation command file 1 is effective only for Customer 1. Then, it is needed to prepare a data manipulation command file customized for every customer. For example, for Customer 2, a file in which a change is made into "σ CustomerID=2" is necessary. In addition, since the data manipulation command files 2 and 3, for example, are available to only customers and delivery persons belonging to the area specified by "BaseID=15", it is necessary to prepare other data manipulation command files for customers and delivery persons belonging to other areas. For the purpose of lessening this problem, if the data manipulation command file 420 is designed to execute a complicated processing, then the amount to be processed by the mobile information terminal 600 is increased.

(3) Since the common data file 410 is large in size, the load on the mobile telecommunication network 400 is increased.

(4) Even when non-uniform radio environments are assumed, little consideration is given to a temporary breakdown of communications.

Hereinbelow, an information service system which can overcome the above-mentioned problems and a gateway 300 and an information terminal 600 used in the system will be described.

Figure 13:
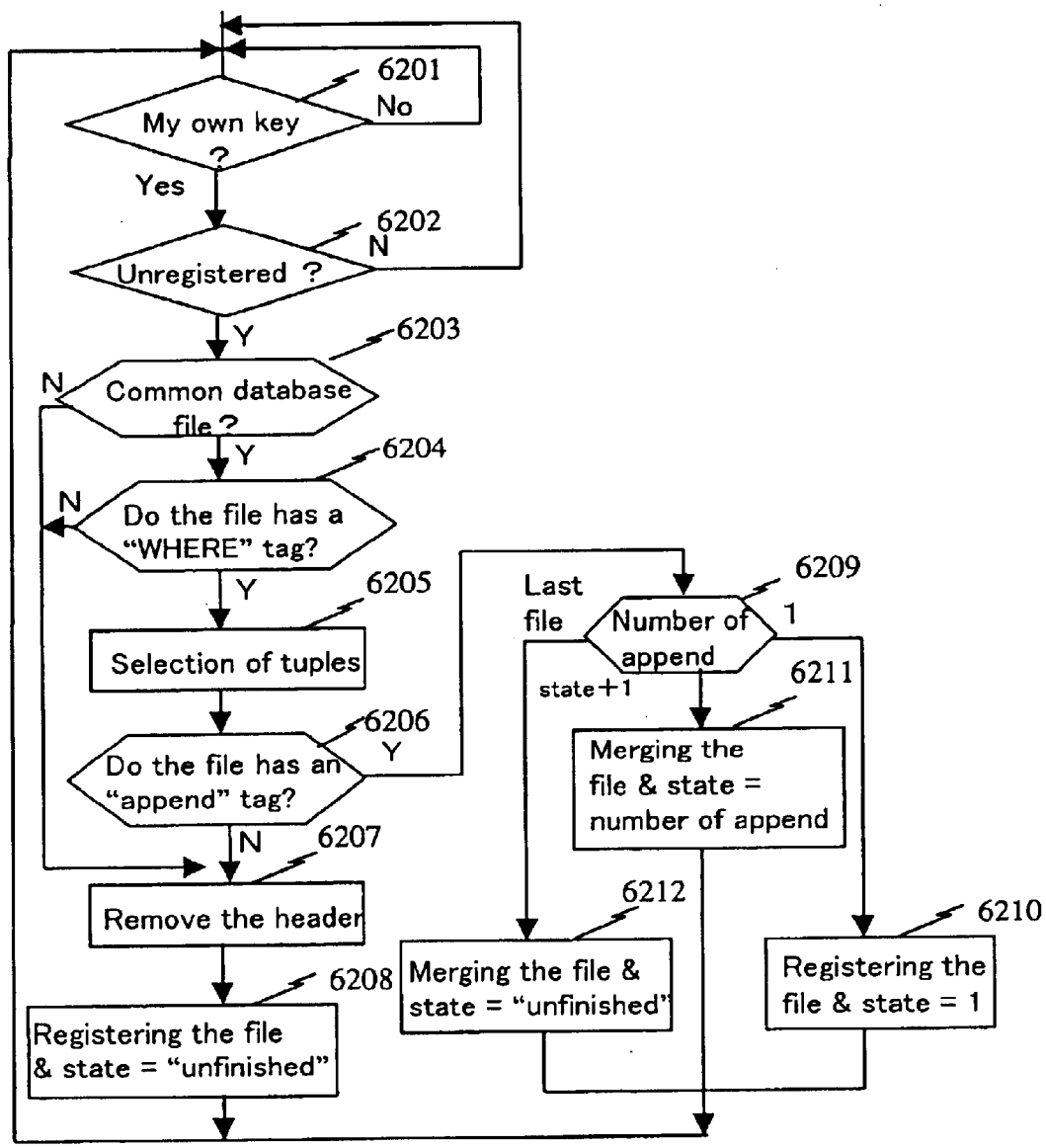
FIG. 13 is a chart showing a processing flow of a data receiver unit of an information terminal according to the present invention.

FIG. 11 is a block diagram illustrating the functions and the processing of the information terminal 600. FIG. 12 shows an example of a common data file 410. FIG. 13 is a chart showing the flow of the processing of a data receiver unit of the information terminal 600.

A file broadcasted from a base station 500 of a mobile telecommunication network 400 is received by a radio frequency receiver unit 610 of the information terminal 600, where the file is converted into a digital data which is processable by a computer. The data receiver unit 620 reads a selection key (see FIG. 2) in step 6201 of FIG. 13, and skips files which are not directed to the information terminal 600 (or a group to which the information terminal 600 belongs). In a memory unit for received data 650, file management information having a "file name", a "current ID number" and the "state of processing" therein is registered for each of the broadcasted files. When a selection key is directed to the information terminal 600, the file name and the ID number described in the file management information are compared with those described in the header. When the both file names are same as each other and the ID number of the header is larger than that of the file management information, it is determined that the information is an unregistered one (Step 6202). For an unregistered information, the header is removed (Step 6207), assigned with the file number described in the header and then registered in the memory unit for received data 650 (Step 6208). The current ID number of the file management information is undated to the ID number described in the header, and the state of processing is rewritten into "unfinished".

When the received file is a common data file 410 (Step 6203), the subsequent processing is performed as follows. When the file has a <WHERE> tag in which the storage criteria are described as shown in FIG. 12 (Step 6204), the result of the selection of only a tuple or tuples having the variable specified based on the criteria (one tuple represents a data surrounded by a <order> tag and a </order>) tag is registered to the memory unit for received data (Step 6205).

In the common data file shown in FIG. 12, an <append> tag indicates information on splitting of the file when the file is broadcasted in splitted form. The file name shown by the <append> tag represents a file name of a split file to be broadcasted, and the value of the <append> tag represents an ordinal number of the split file in the original file (i.e., an ordinal position at which the split file is joined to reconstruct the original file). In a tag <BaseID op="eq" const="you.BaseID"> which describes the criterion for selection of a tuple, "op" represents an operator which specifies the constraint of an attribute, "const" represents a value of the constraint of the attribute. The operator "op" include the following five types: "eq" (equal), "gt" (>), "lt" (<), "ge" (equal or greater) and "le" (equal or less). In the present embodiment, "you" in a character string "you.BaseID" which represents the value of the constraint is given a special meaning. That is, "you" is used as a command to read the value of a variable having the same name from the below-mentioned memory unit for attribute 670 and replace the value with "you". In this case, a tuple is selected in which an attribute "BaseID" matches "you.BaseID", in other words, a tuple in which the attribute "BaseID" is equal to the BaseID stored in its memory unit for environment variable 670, is selected.

In FIG. 12, date resulted from the selection of only a tuple in which the attribute "BaseID" has the designated value is registered. In this figure, there is described "you.BaseID". However, for example, when there is described a number "15" in place of "you.BaseID", two tuples having BaseID of 15 in FIG. 12 are selected and registered. Tuples having other attribute values are deleted from the registered data. In this way, it becomes possible to register only information necessary for a user into the memory unit for received data 650.

When an <append> tag is present in the <WHERE> tag (Step 6206), if its value is 1, the file is stored in the memory unit for received data 650 in the form appended with the file name indicated by the <append> tag (in FIG. 12, "order.xml") and the value of the state of processing of the file management information is set to "1" (Step 6210). When the value of the <append> tag is "the value of the state of processing of the file management information +1", the received content is added to the file indicated by the <appended> tag which has been stored in the memory unit for received data 650, and the value of the state of processing of the file management information is set to the value indicated by the <append> tag (Step 6211). When the value shown by the <append> tag indicates the last value, the received content is added to the file which has been stored in the memory unit for received data 650 in the same manner and, at the same time, the value of the state of processing of the file management information is set to "unfinished" (Step 6212). In this way, even when one file is broadcasted in splitted form, it becomes possible to join the split file portions to reconstruct them into the original file. Here, the value indicating "the last value" may be represented by, for example, the last number appended with "−" (a minus sign). A file having the <append> tag is deleted from the memory unit for received data 650 after the processing is completed and only the file management information for the file is remained, whereby unnecessary memory and processing can be eliminated. The function mentioned above enables the broadcasting and receiving of a database in splitted form. This can improve the impossibility of broadcasting a database that cannot be broadcasted due to deterioration of communication state.

When a file of which the state of processing of the file management information is "Unfinished" is present in the memory unit for received data 650, a data processing unit 630 reads the file and stores it in a memory unit for browsing data 660, and the state of processing of the file management information is rewritten into "Finished". For a data manipulation command file 420, the data manipulation command file 420 is executed, and only the result is stored in a memory unit for browsing data 660, and the data manipulation command file 420 itself is not stored. The data manipulation command file 420 is executed upon updating the common data file 410 to be manipulated by the data manipulation command file 420.

Figures 14, 15:
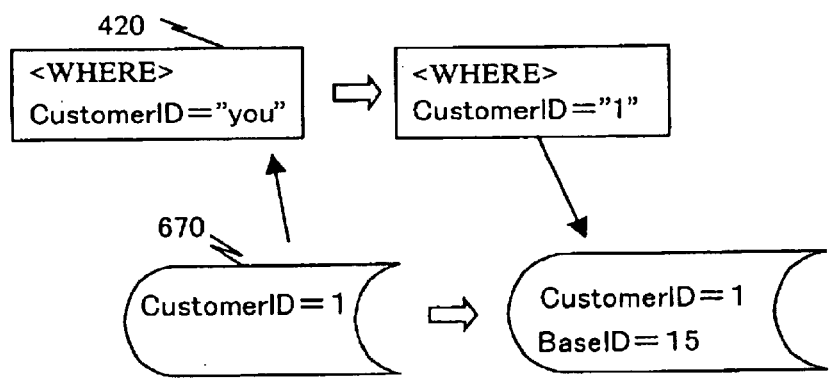
FIG. 14 is an illustration of an example of a data manipulation command file according to the present invention.
FIG. 15 shows the flow of the setting of an environment variable.

In the information terminal 600 of FIG. 11, there is provided a memory unit for environment variable 670 which stores names and values of a plurality of variables in pairs. Here, a hypothesis is made that information in which a value of a variable "CustomerID" is 1 (which is written as "CustomerID=1") is previously stored. FIG. 14 shows an example of a data manipulation command file 420 for <SETenv> tag which instructs the modification of a variable stored in the memory unit for environment variable 670.

In FIG. 14, a <FROM> tag specifies a common data file to be manipulated, a <WHERE> tag specifies a condition of retrieval, and a <SELECT> tag specifies an attribute to be set. In this figure, it is instructed, for an "Order.xmld" file as a target, to register a value of an attribute (BaseID" in a tuple having a "CustomerID" of "you" (if an attribute name to be compared is the same, the attribute name can be omitted; in this case, it has the same meaning as "you.CustomerID") into the memory unit for environment variable 670 in a pair with the specified variable name. When the constraint value of the attribute is a specific code as in the data manipulation command file 420 shown in FIG. 14 (in which the code is "you"), the data processing unit 630 reads a value of the variable of the same name from the memory unit for environment variable 670 and replaces "you" with the value, as shown in FIG. 15. That is, in the case shown in FIG. 15, since "1" is registered to the memory unit for environment variable 670 as the value of the variable "CustomerID" and "you" in the data manipulation command file 420 is replaced with "1", the condition of retrieval command is "CustomerID=1". If the file shown in FIG. 12 is an "Order.xmld" file, a tuple for a customer "AAA" having "CustomerID=1" is selected, the attribute value of the "BaseID" is added to the memory unit for environment variable 670 as "BaseID=15". Accordingly, when the file FIG. 12 having the modification is re-sent, the constraint of "BaseID" in the <WHERE>tag of FIG. 12 is set to "15". If the variable having the same name is already present in the memory unit for environment variable 670, the value of the variable is rewritten and updated. If the value to be set is a predetermined character string (e.g., "delete"), the variable is deleted from the memory unit for environment variable 670.

As shown in FIG. 14, in the data manipulation command file 420, a command described through conventional SQL language for database is sent. Therefore, although complicated manipulations may be possible, the amount to be processed by the information terminal becomes increased, which is not desirable for mobile equipment. According to the present invention, it becomes possible to select, process and provide only information which fits user's needs without increasing the amount to be processed to much extent. As mentioned above, by using as a "seed" an attribute value which is initially registered, a different environment variable can be generated for every user even by the same data manipulation command file 420. That is, an information supplier can construct an environment suitable for every user without broadcasting a different data manipulation command file 420 to the every user.

Figures 16, 17:
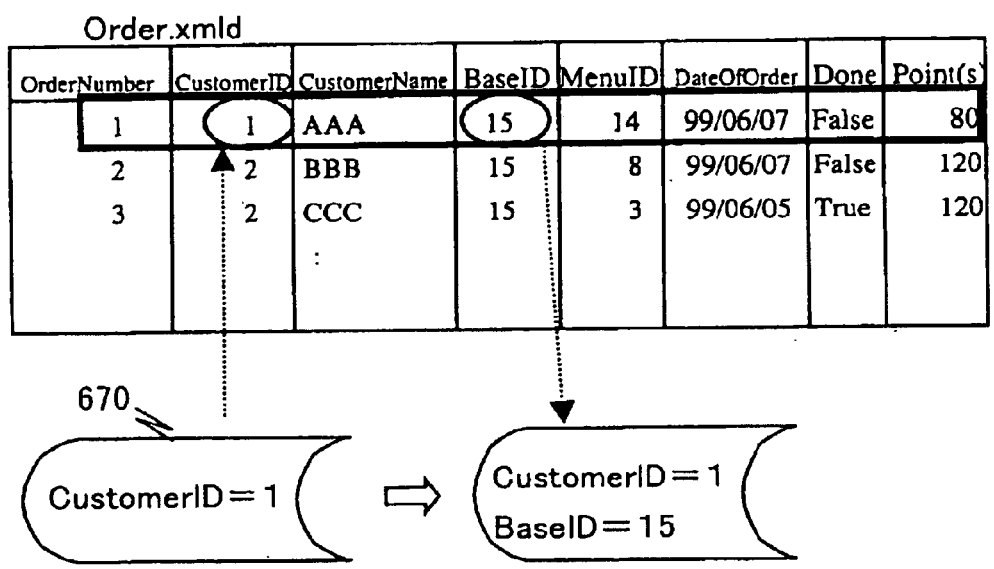
FIG. 16 is a supplemental illustration of the flow of setting of an environment variable of FIG. 15.
FIG. 17 shows another example of a common data file according to the present invention.

For example, in FIG. 16, when an attribute value of "Point" given based on the purchase price at the most right portion of the table is stored in the memory unit for environment variable 670 in place of the attribute value of "BaseID", "Points=80" and "Points=12" are set in the information terminals of Customer AAA and Customer BBB, respectively. This can be achieved by broadcasting the common data file shown in FIG. 16 and the data manipulation command file shown in FIG. 14 in which the attribute specified by the <SELECT> tag is changed into "Point" (i.e., the data manipulation command file of FIG. 14 in which "<ATR Name="BaseID">BaseID</ATR> is changed into "<ATR name ="Point">points</ATR>. In this state, the common data file 410 of FIG. 17 (which is actually presented in the same manner as shown in FIG. 12) is send. When the storage criteria is "Attribute FROM<you.Point" and "Attribute TO>you.Point", Customer BBB can be provided price information cheaper than that provided to Customer AAA (shown in a dotted box in FIG. 17).

It is also possible to modify the contents of the memory unit for environment variable 670 directly from the information terminal 600 by a user, or indirectly based on information given by a position detection equipment or an IC card connected to the information terminal. Consequently, information more fitting user's needs can be provided, such as information based on the present location of a car or information based on points given according to the amount paid for off-line purchases.

For example, when a car navigation system and an information terminal is connected so that the position-detection results (latitude and longitude) of the car navigation system mounted on a car are stored in a memory unit for environment variable 670 of the information terminal, on the part of the information terminal, only information on a location around the present location of the car can be selected automatically and information based on the current location of a user can be found promptly, by broadcasting information (i.e., a common data file) of which one of the attributes is the combination of the latitude and longitude to the information terminal. On the other hand, when point-related information stored in an IC card can be stored in a memory unit for environment variable 670, even if the point management is performed only by the IC card, information based on the points can be provided.

It is also possible to perform the point management by linking an IC card with a server 100. Points given often vary depending on the contents and the term of a contract with a supplier. In addition, management of the expiration data of the points for every deal is needed. For the management and computation of user's points based on these items, a centralized processing by a server 100 which has a larger memory capacity and a high throughput is suitable. On the other hand, for adding of points according to the amount paid for a purchase, an IC card is suitable, since the points can be added to an IC card promptly in a store the user purchased. The use of an IC card is also advantageous on the part of stores, since the communication cost is reduced and the adding of points as the store's own discretion is possible. Accordingly, information service based on the points without any time-lag becomes possible by storing the sum of the point information from the server 100 and the point information from the IC card into the memory unit for environment variation 670 in the information terminal 600. The point information stored in the IC card is retrieved into the server 100 at proper intervals to thereby prevent the increase in load on the IC card or excessive accumulation of the information in the IC card.

In the above explanations, there was no mention about order method or collection of bills. However, the works to perform these tasks are very burdensome actually. According to the present invention, this problem can be solved by the use of an IC card in combination. Future menus for meal delivery services can be provided through a "Menu" common data file as shown in FIG. 5. In addition, by providing additional attributes such as image file name or subjects (which is classified depending on the condition of a user's health and so on), it becomes possible to provide image information or order menus customized for each user.

Figures 18, 19:
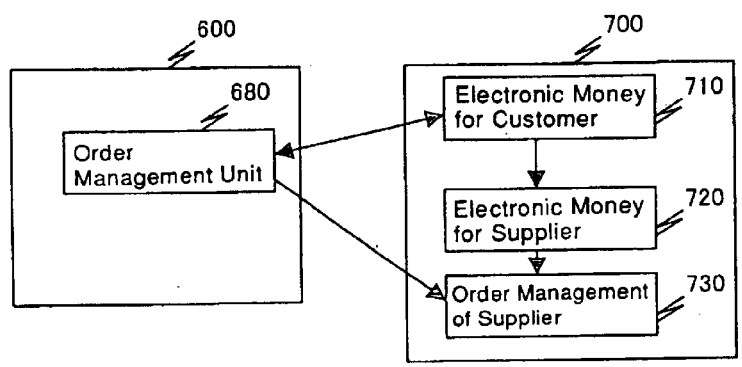
FIG. 18 is an explanatory illustration of the exchange of information between an IC card and an information terminal.
FIG. 19 is an explanatory illustration of a display having thereon input fields for a menu and a password.

In recent years, development of a mobile telephone into which an IC card is integrated to impart a reader-writer function of the IC card as an interface is well in progress. An IC card is already well on its way to being capable of performing a plurality of programs simultaneously. As shown in FIG. 18, into an IC card 700 carried by a customer, the following three kinds of programs are installed: a program for management of electronic money for customer 710; a program for management of electronic money for supplier 720; and an order management program of supplier 730. An order processing program (i.e., an order processing unit) 680 in the information terminal 600 runs to display the menu file shown in FIG. 5. Upon selecting any menu from the menu file by a customer, a display screen having fields for inputting the selected menu and a password of the customer is displayed.

Upon inputting the customer's password, the order processing program 680 runs to send the password, the supplier's ID number and the price of the menu to the management program for electronic money for customer 710, and also send the customer's ID number, the menu ID number and the price to the order management program of supplier 730. Upon receiving the order, the order management program of supplier 730 stores therein the order information in the form appended with a provisional order number and, at the same time, sends the order number back to the order processing program 680. When the password is matched, the management program for electronic money for customer 710 sends a processing ID to the order processing program 680. Upon receiving the processing ID and the order number, the order processing program 680 sends the both numbers to each of the management program for electronic money for customer 710 and the management program for electronic money for supplier 720. The management program for electronic money for customer 710 then transfers the money corresponding to the price (when one menu is ordered) into the management program for electronic money for supplier 720. The management program for electronic money for supplier 720 which has received the money sends information on the receipt to the order management program of supplier 730, and the order management program 730 is then confirms the order. In this manner, the management program for electronic money for customer 710 can store the processing ID, the menu ID number, the price and the order number, the management program for electronic money for supplier 720 can store the processing ID and the order number, and the order management program of supplier 730 can store the processing ID, the customer's ID number, the menu ID number, the price and the order number, for reporting purposes. Based on the stored report, cancellation and confirmation of the order can be achieved safely.

A meal delivery person accesses to the management program for electronic money for supplier 720 and the order management program of supplier 730 in the IC card 700 carried by the customer to confirm the order and collect and the bill. The IC card 700 may be integrated into the information terminal 600 as an IC chip.

In this way, it becomes possible for both the customer and the supplier to process the exchange of orders and bills without having real moneys on hand. Further, this system is good in safety, since a customer can input his password and order menus out of a person's sight. Moreover, since the customer can input these items with a sense of security, an inputting error can be reduced, resulting in prevention of the order error on the supplier's part. As mentioned previously, since the display of the order menus is processed by the information terminal 600 automatically depending on the conditions of a customer's health and so on, it is not necessary for a delivery person to take these items into consideration.

Figure 20:
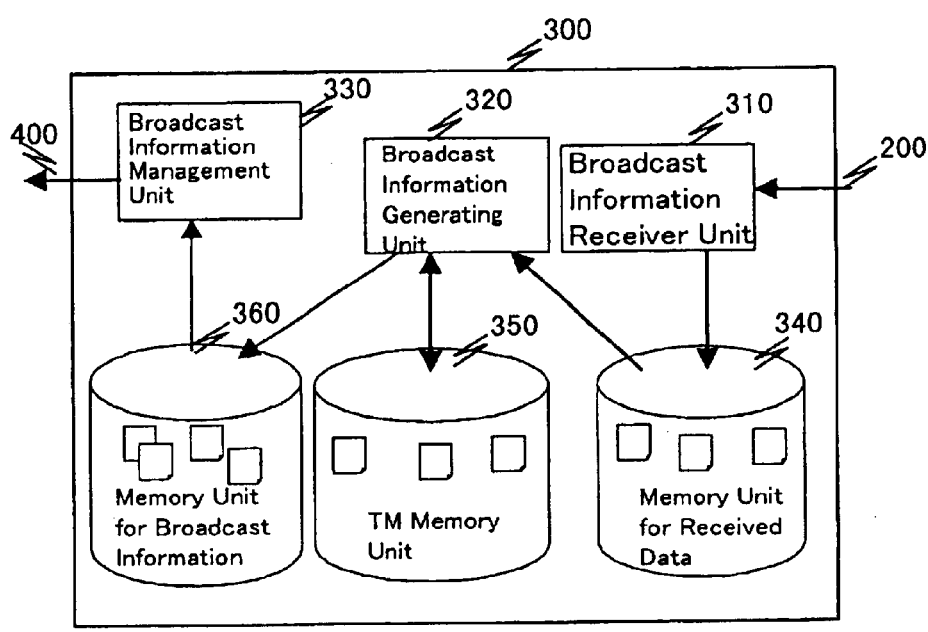
FIG. 20 is a block diagram showing the processing of an embodiment of a gateway according to the present invention.
Figure 21:
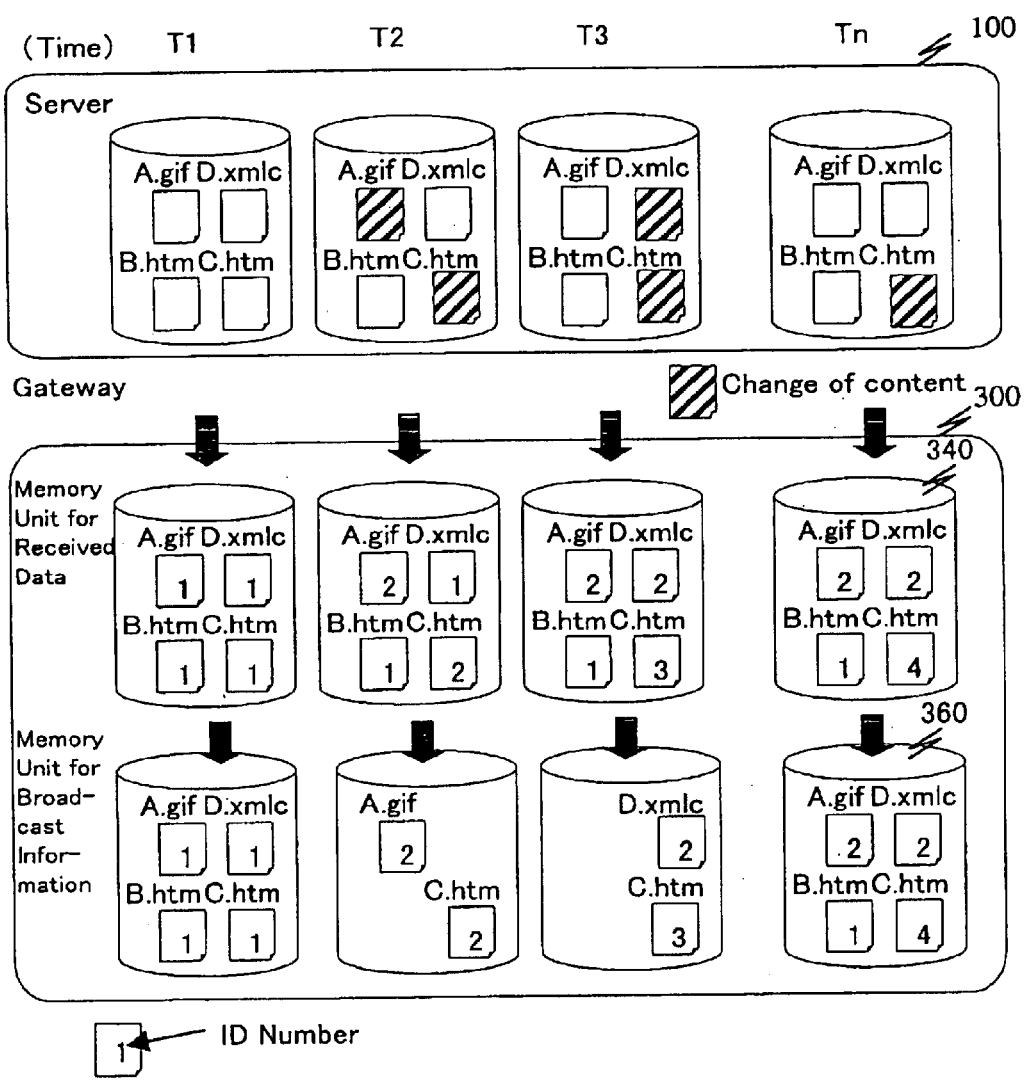
FIG. 21 is a diagram showing the file-version management processing by a gateway according to the present invention.

FIG. 20 is a block diagram showing the function and the processing of a gateway 300. A data receiver unit 310 accesses to a server 100 through an internet 200 at regular time intervals (T1, T2, T3, . . . ) as shown in FIG. 21. The data receiver unit 310 then reads a text file, HTML file or an image file (e.g., GIF, and JPEG) in which the contents are updated compared with the file stored in a memory unit for received data 340, and stores it in the memory unit for received data 340. Such a function can be achieved using a conventional technique (e.g., use of a Web server). On the other hand, a common data file is unconditionally read. In a directory file for specifying the file to be read in the server 100, "file name", "selection key", "main key of database (only for database)" and "significance" are described. The directory file is stored in the server 100. The gateway 300 reads the directory file, and then reads the file in accordance with the instruction of the directory file. Files in the gateway 300 are managed by the information combined with the information on the ID number of each file. In FIG. 21, the number in an icon of a file represents an ID number. When a file is first stored in the memory unit for received data 340 (time=T1 in FIG. 21), the ID number of the file is set at "1", and increased by one at each update (time=T2 and T3 in FIG. 21).

Figure 22:
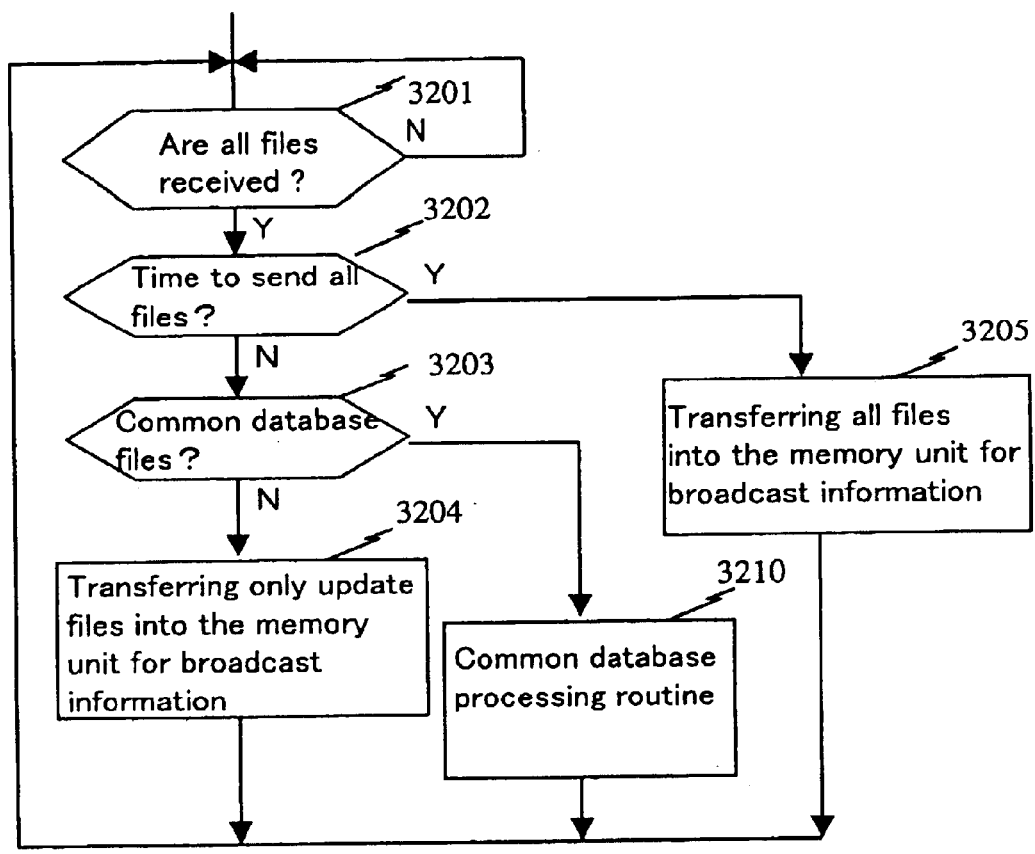
FIG. 22 is a chart showing a processing flow of a broadcast information generating unit of a gateway according to the present invention.

Among the files other than the common data file, only those in which the content is updated is transferred to a memory unit for broadcast information 360 by a broadcast information generating unit 320 in principle, as shown in FIGS. 21 and 22 (Step 3204 in FIG. 22). A broadcast information management unit 330 broadcasts the files stored in the memory unit for broadcast information 360 via a mobile telecommunication network 400. When the broadcasting is completed, the memory unit for broadcast information 360 is made empty. The broadcast information generating unit 320 transfers all of the files stored in the memory unit for received data 340 to the memory unit for broadcast information 360 at regular time intervals (time=Tn in FIG. 21) and broadcasts them to the information terminal 600 (Step 3205 in FIG. 22). The information terminal 600 can receive all of the information with minimum accesses by synchronization with the broadcasting.

As mentioned previously, the broadcast information management unit 330 broadcasts a file in the form shown in FIG. 2 to the mobile telecommunication network 400. As the information on the selection key and the file name shown in FIF. 2, the corresponding information obtained from the directory file in the server 100 is stored. As the ID number, a value determined in the above-mentioned procedure is stored. However, it is burdensome to manage the selection keys of all files only by the server 100. A file such as GIF and JPEG is utilized in HTML file or a common data file. Therefore, the broadcast information management unit 330 searches the content of the HTML file or the common data file stored in the memory unit for broadcast information 360. When a file name such as GIF or JPEG is contained, the broadcast information management unit 330 sets a selection key of the HTML file or the common data file as the selection key of the related file such as GIF or JPEG and broadcasts it. In this way, management of a selection key in the server 100 can be performed readily. The broadcast information management unit 330 broadcasts the same file repeatedly so as to compensate for temporary breakdown of the communication. The number of broadcasting operations may be determined depending on the significance specified by "Significance" of the directory file.

Figure 23:
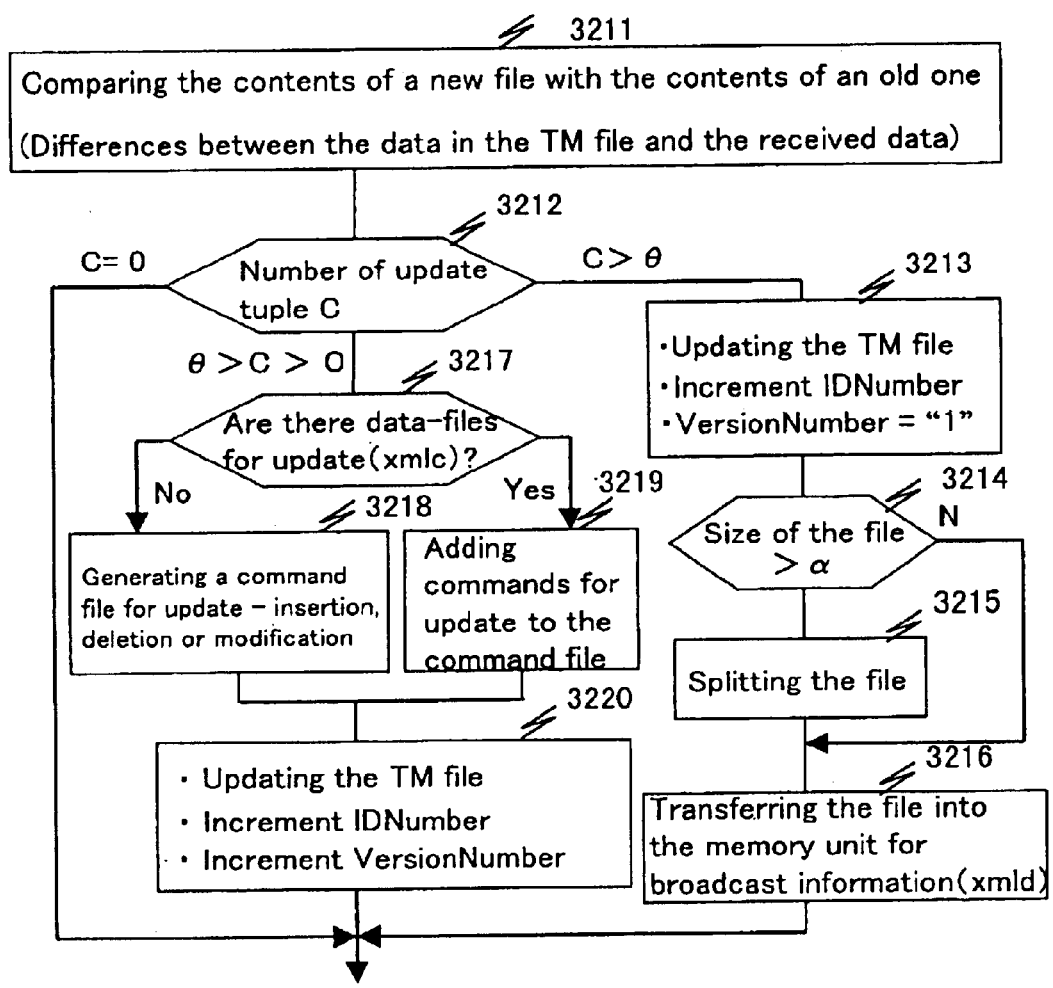
FIG. 23 is a chart showing a processing flow for generating of a common data file according to the present invention.

On the other hand, for the common data file, the following processing is performed. In a TM memory unit 350 shown in FIG. 20, each of the immediately preceding common data files in the memory unit for received data 340 is stored. For example, at the point of time T2 of FIG. 21, a data in the memory unit for received data 340 stored at T1 is transferred to the TM memory unit 350. In Step 3211 of FIG. 23, the broadcast information generating unit 320 compares each common data file stored in the memory unit for received data 340 with the contents of the TM memory unit 350 to count the number of the modified tuples. Here, the term "modify" or "modification" includes the following: insertion of a tuple or tuples; deletion of a tuple or tuples; and modification (or change) of an attribute value or values of a tuple or tuples.

When no tuple is modified, any processing is not performed. When the number of modified tuples (C) is equal to or larger than a certain threshold value θ, the common data file in the memory unit for received data 340 is stored in the memory unit for broadcast information 360 in Step 3216 in principle. As a preparation to the subsequent processing, the common data file in the memory unit for received data 340 is transferred to the TM memory unit 350 in Step 3213. The ID number is updated by +1 for each time.

When the size of a common data file is large (in Step 3214, not smaller than α), the common data file can be splitted in the form shown in FIG. 12, thereby generating a series of splitted common data files. A file name of each of the splitted common data files is described as a value of "File" of the <append> tag, and the <append> tags of the splitted common data files are numbered from the head file to the tail file (1, 2, 3, . . . ). The file names of the split files can be identified and managed readily on the part of the information terminal 600 by assigning to the file names, such as "order#1.xmld", "order#2.xmld" and so on as shown in FIG. 12.

When the number of modified tuples is equal or smaller than the certain threshold value θ, a data manipulation command file 420 for partially modifying the common data file which has already been broadcasted is prepared (Step 3218) and broadcasted, rather than broadcasting the whole of the common data file. The data manipulation command file 420 may be prepared so that all of insertion and deletion of a tuple and modification of an attribute value in a tuple in a common data file can be provided. Examples of the manipulation description file 420 for modification of an attribute value in a tuple, insertion of a tuple and deletion of a tuple in a common data file are shown in FIGS. 25, 26 and 27, respectively. All of these examples are instructions to the common data file "order.xmld" shown in FIG. 12 which has been already broadcasted. The data manipulation command file of FIG. 26 instructs to insert a tuple sandwiched by <PRO> tags (i.e., OrderNumber 31), and the data manipulation command file of FIG. 17 instructs to search for a tuple of "OrderNumber=1" and delete it.

Figure 24:
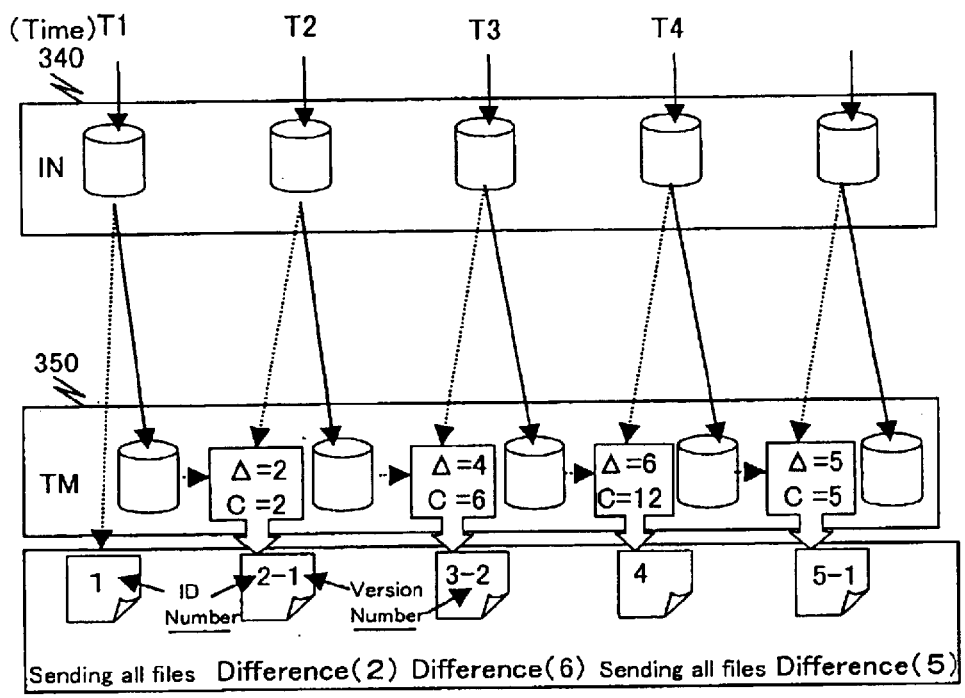
FIG. 24 is a diagram showing the broadcasting procedure for partial information.

When a modification in which the number of modified tuples is not lager than the certain threshold value θ is to be performed consecutively (Step 3217), the data manipulation command file prepared and broadcasted last time to which a modified portion determined this time as a difference is further added is prepared and broadcasted (Step 3219), rather than only a data manipulation command file for only the modified portion relative to the last one is broadcasted. For example, in FIG. 24, when the threshold value θ is 10, assuming that two tuples are modified at T2 and four tuples are modified at T3 relative to their last ones, information for modification of two tuples is broadcasted at T2 and information for modification of four tuples in addition to the two tuples at T2 (i.e., modification of six tuples in total) is prepared and sent. In this case, each of the two pieces of information for modification is assigned with a version number, respectively, so that it can be comprehended which is the information for modification to be send at T2 or T3. In FIG. 24, "Δ" represents the number of modified tuples relative to the data broadcasted last time, and "C" represents the total number of modified tuples counted through the entire file transfer.

An example of the data manipulation command file 420 used for modifying an attribute value of a tuple is shown in FIG. 25. This data manipulation command file 420 instructs the modification of the common data file, in which the value of a <Done> tag is changed from "False" into "True" in two tuples. The number described at "version" in the <OPR> tag represents the version number. This enables to achieve the modification appropriately at T3 even if the information terminal 600 cannot receive the information for modification at T2. If the information for modification is received both at T2 and T3, occurrence of overlapped update at T3 can be prevented.

As mentioned above, according to the present invention, since it is unnecessary to send the whole of data every time, the load on the mobile telecommunication network 400 and the burden on an information terminal 600 can be reduced. Moreover, even when non-uniform radio environments are assumed and the data cannot be received continuously, the information can be received.

In the description above, the modification of a common data file is detected by a gateway 300. However, it may be possible to perform the read processing of a log of insertion, deletion and modification of a tuple or tuples of a database from the server 100. In the gateway 300, the log is stored in the same manner as for other files and compared the log with a new log. When the number of modified tuples is not smaller than θ, the whole of the common data file is broadcasted. When it is not larger than θ, a data manipulation command file 420 for modifying an attribute value of a tuple as shown in FIG. 25 is prepared. In this file, commands for insertion, deletion and modification of a tuple or tuples are arranged in the execution sequence. In this way, the burden on the processing of Step 3211 in FIG. 23 can be reduced and the amount to be processed by the gateway 300 can be decreased.

According to the present invention, information which fits needs of each user can be provided flexibly without increasing the memory capacity or the amount to be processed of an information terminal which receives the information. In addition, on the part of an information supplier, it becomes possible to provide information which fits needs of each user flexibly without providing any command or data customized for every user. It also becomes possible to broadcast information which can compensate for temporary breakdown of communications, puts less load on a communication network and has little redundancy, timely and flexibly.

The invention has been described in detail with reference to various embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. An information terminal comprising:

a memory unit for attribute/value which stores a name and a value of a an attribute in a pair;

a receiver unit which receives a file broadcasted to a plurality of terminals; and a processing unit which processes the received file, wherein said received file is classified into a common data file and a data manipulation file both having a header portion and data portion, wherein said header portion includes a selection key for the terminal to identify whether the received file is addressed to the terminal, an ID number and a file name to compare the received file and previously received file, wherein said data portion of the common data file is presented in tabular form, wherein said data manipulation file includes an attribute constraint used for processing the tuples in the data portion, wherein when the broadcasted file is received at the receiver, the processing unit reads the header portion of the received file, and selects the file according to the following procedure including:

selecting a file addressed to the terminal by reading the selection key;

comparing the ID number and the file name with that of previously received file stored in the memory unit; and copying the header portion and data portion of the received file into the memory unit, if the file is the common data file, the ID number is different to that of the previously received file and the file name is matched to that of previously received file, wherein said processing unit executes a customization of the data portion only to the file copied in the memory unit in accordance with the attribute constraint stored in the data manipulation file.

2. The information terminal according to claim 1, wherein the attribute constraint is one concerning the selecting a portion of the data in the received file, the processing unit selects the portion of the data in accordance with the attribute constraint and stores only the selected data as the content of the received file.

3. The information terminal according to claim 1, wherein when a command for modification or insertion or deletion of the attribute stored in the memory unit is described in the received file, the processing unit executes the modification or the insertion or deletion of the attribute in accordance with the command.

4. The information terminal according to claim 1, wherein when a manipulation for generating a new file or updating data which has been received is described in the received file, the processing unit executes the generation or updating.

* * * * *